US008122504B1

(12) United States Patent
Bush et al.

(10) Patent No.: US 8,122,504 B1
(45) Date of Patent: *Feb. 21, 2012

(54) FLOOD ATTACK PROJECTION MODEL

(75) Inventors: Stephen Francis Bush, Latham, NY (US); Amit Bhavanishankar Kulkarni, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/579,456

(22) Filed: Oct. 15, 2009

Related U.S. Application Data

(62) Division of application No. 10/965,248, filed on Oct. 14, 2004, now Pat. No. 7,620,985.

(51) Int. Cl.
*G06F 11/00* (2006.01)
(52) U.S. Cl. ........................................ 726/22
(58) Field of Classification Search ...................... 726/22
See application file for complete search history.

(56) References Cited

U.S. PATENT DOCUMENTS

| 5,276,677 | A | 1/1994 | Ramamurthy et al. |
| 5,485,409 | A | 1/1996 | Gupta et al. |
| 5,684,957 | A | 11/1997 | Kondo et al. |
| 5,887,029 | A | 3/1999 | Husted et al. |
| 5,892,903 | A | 4/1999 | Klaus |
| 6,088,804 | A | 7/2000 | Hill et al. |
| 6,195,700 | B1 | 2/2001 | Bender et al. |
| 6,424,358 | B1 | 7/2002 | DiDomizio et al. |
| 6,498,968 | B1 | 12/2002 | Bush |
| 6,536,040 | B1 | 3/2003 | Curtis |
| 7,620,985 | B1 * | 11/2009 | Bush et al. ............ 726/22 |
| 2003/0056194 | A1 | 3/2003 | Iglesias |
| 2003/0208505 | A1 | 11/2003 | Mullins et al. |
| 2004/0025018 | A1 | 2/2004 | Haas et al. |
| 2004/0054505 | A1 | 3/2004 | Lee |

FOREIGN PATENT DOCUMENTS

| WO | 0070463 | 11/2000 |
| WO | 0248959 | 6/2002 |

OTHER PUBLICATIONS

S. F. Bush, "Active Virtual Network Management Prediction: Complexity as a Framework for Prediction, Optimization and Assurance", General Electric Corporate Research and Development; arXiv:cs.NI/0203014 vl; Mar. 11, 2002.
Dietrich et al, "Analyzing Distributed Denial of Service Tools: The Shaft Case", USENIX Association, "Proceedings of the 14th Systems Administration Conference" New Orleans, LA, Dec. 3-8, 2000, pp. 329-339.
Dinda et al, "An Extensible Toolkit for Resource Prediction in Distributed Systems", School of Computer Science, Carnegie Mellon University, Jul. 1999, CMU-CS-99-138, pp. 1-34.
Swiler et al, "Computer-Attack Graph Generation Tool", 2001 IEEE, 0-7695-1212-7/01, pp. 307-321.
S. F. Bush et al, "Active Networks and Active Network Management, A Proactive Management Framework", 2001 Kluwer Academic/Plenum Publishers, New York, Chapters 7 and 9.
Bush, S.F. et al, "Active Virtual Network Management Protocol", General Electric Corporation Research and Development, 13th Workshop on Parallel and Distributed Simulation, May 1-4, 1999 Atlanta, Georgia, USA, PASD '99.
Bush, S.F. et al, "Islands of Near-Perfect Self-Prediction", General Electric Corporation Research and Development, Virtual Worlds Simulation Conference '00 and 2000 Western MultiConference, Jan. 2000.
U.S. Appl. No. 10/965,249 entitled, "Embedded model interaction within attack projection framework of information system" in the name of Bush, filed Oct. 24, 2004.
Abandoned U.S. Appl. No. 10/964,879 entitled "Embedded real-time information cyber attack damage assessment method and system", in the name of Bush et al.

\* cited by examiner

*Primary Examiner* — Jacob Lipman
(74) *Attorney, Agent, or Firm* — Howard IP Law Group

(57) ABSTRACT

A flood attack of an information system is simulated by injecting an algorithmically compressed flood attack model into the information system to assess the effect of the attack upon the system. The flood attack model propagates from node to node throughout the system by way of virtual messages that time-project the flood attack model and do not disrupt system operation while the simulated flood attack is taking place. Programs of executable code installed on nodes of the information system generate and send the virtual messages describing the flood attack.

8 Claims, 9 Drawing Sheets

FLOOD ATTACK PROJECTION MODEL

This application is a divisional of the co-pending U.S. patent application Ser. No. 10/965,248, filed on Oct. 14, 2004.

FIELD OF THE INVENTION

The present invention relates to information systems and more particularly, to the simulation of a flood attack upon an information system.

BACKGROUND

Electronic information systems including communication networks and various computer networks have become prevalent and relied-upon in all aspects of today's society. This is true in the technological communities of business and industry, the military, government and in various other areas of information technology and communications. Many businesses, technologies, governments and people are critically dependent upon the uninterrupted and reliable operation of these information systems. An information warfare or other attack on such an information system can disable the system and bring activity to a standstill. The impact of such an attack may be devastating and therefore such attacks upon information systems must be prevented. Measures should be taken to study the attacks that may occur, predict when they may occur and also predict their impact upon the information system. Understanding the impact of an expected attack increases information assurance for mission critical components of a communication network.

One of the most lethal and damaging attacks is a flood attack. Such an attack clogs up traffic within the information system and can disable a system by denying a user access to the system. It would be advantageous to assess the impact a flood attack would have upon a system. It is difficult to assess the impact such a flood attack would have on a system without actually attacking the system, however. This is obviously undesirable because if the flood attack is actually run on the system, it may destroy or disable the system.

It would therefore be desirable to study the impact of a flood attack upon an information system by simulating the attack and evaluating the impact of the simulated attack upon the system. The simulated flood attack may also, however, adversely impact system operation. It would be therefore be further desirable to simulate actual system operation during the simulated flood attack to assess the impact such an attack would have upon the system without affecting the normal operation of the real system.

SUMMARY OF THE INVENTION

In one aspect of the present invention, there is provided a communication network comprising a plurality of nodes including an active host node and a plurality of further active nodes. A target node is included among the plurality of further active nodes. The communication network also includes, on each of the plurality of further active nodes, a network component that transports packets. Attack handlers are inserted on participating nodes of the plurality of further active nodes. The attack handlers generate virtual messages, send virtual messages to the target node and receive messages from other attack handlers. The target node does not include an attack handler. An attack master disposed on the active host node injects the attack handlers onto the participating nodes and sends an initiate attack message to the attack handlers. The communication network may further includes means for sending a flood attack model throughout the communication network. The flood attack model does not disrupt the operation of the communication network.

In another aspect, the invention provides a method of simulating a flood attack in a communication network. The method includes providing a communication network, injecting an algorithmically compressed flood attack model into the communication network, and causing the flood attack model to propagate through the communication network.

In another aspect, the method includes the communication network including an active host node and a plurality of active nodes and injecting includes installing on each of the plurality of active nodes and on the active host node, a network component that receives and transports active packets. Further, an attack master is provided on the active host node. The attack master injects an attack handler capable of generating virtual messages, on active nodes of the plurality of active nodes. The method also includes sending a packet to the attack master causing the attack master to communicate with the attack handlers.

BRIEF DESCRIPTION OF THE DRAWING

The present invention is best understood from the following detailed description when read in conjunction with the accompanying drawing. Like numerals denote like features throughout the specification and drawing. Included in the drawing are the following figures.

DETAILED DESCRIPTION

Figure 1:
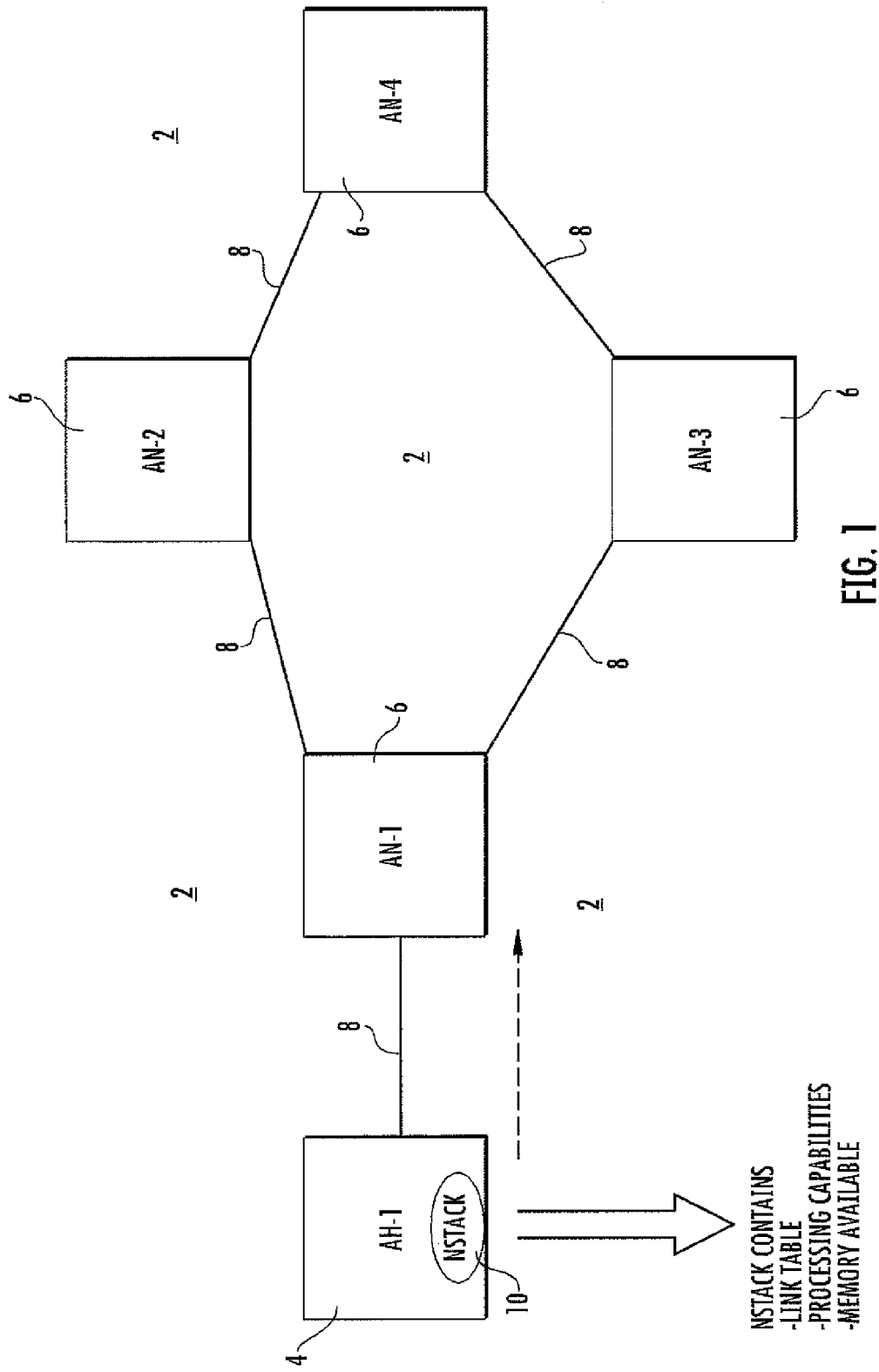
FIGS. 1-9 are schematic views of an exemplary network and sequentially show the commencement of a flood attack on a communication network according to the present invention.

The method and system of the present invention provide for forecasting effects of a flood attack upon infrastructure assets of an information system such as a communication network. The flood attack projection model may be used as a stand-alone or it may be injected into an operating information system without adversely affecting the operation of the information system.

The communication network of the present invention may be any of various communication and information systems including various computers and computer networks, and includes an active host node and further active nodes. A target node is included among the further active nodes. The communication network of the present invention includes a network component, an attack target, attack packets, an attack master and attack handlers. The network component is present on the further active nodes and acts to transport packets. Attack handlers are programs of executable code present on each of the further active nodes that participate in the flood attack simulation, but not on the target node. A key simulated network service that is the target of the attack, resides on the target node. The attack handlers generate virtual messages, send and receive virtual messages to and from the other active nodes with attack handlers and send virtual messages to the target node. The attack master is a program of executable code that determines which nodes are to participate in the attack simulation, injects the attack handlers onto active nodes that participate in the flood attack simulation and also sends an initiate attack command to the attack handlers that causes the attack handlers to commence their virtual assault upon the system.

The present invention provides a method of simulating a flood attack in a communication network. A communication network is provided and an algorithmically compressed flood attack model is injected into the communication network. An example of algorithmic compression involves representing information in the form of executable code as opposed to a static data representation. In an exemplary embodiment, the algorithmic compression may be accomplished by the transmission of a small program that represents a large number of packets, rather than the actual large number of packets. The algorithmic compression reduces actual load on the system while simulating a bandwidth denial of service attack. For example, while a flood attack could be represented by the insertion of 10^6 packets (large size, non-algorithmic) into the network, an algorithmically compressed model may include the insertion of a much shorter program that loops 10^6 times, generating a packet each time. Another exemplary algorithmic compression is accomplished by the transmission of a large amount of email in order to clog an e-mail client. The large amount of e-mail is not actually sent, but rather a program is transmitted that may recreate the e-mail volume on the target node. The flood attack model is caused to propagate through the communication network. The injection of the algorithmically compressed flood attack model may include installing, on each of the plurality of active nodes and on the active host node, a network component capable of receiving and transporting active packets, and providing an attack master on the active host node. The attack master is a program of executable code that injects an attack handler capable of generating virtual messages, on some of the active nodes. A packet is sent to the attack master causing the attack master to communicate with the attack handlers, typically by sending an initiate attack message to each of said attack handlers.

Only information that describes the flood attack traffic is transmitted, and this information is transmitted in virtual messages. The flood attack models used for attack projection therefore do not impact the actual system. Rather, the "virtualized" flood attack is injected into the virtual plane embedded within the system. The flood attack model is flexible enough to create different types of flood attacks such as bursty traffic, flash crowds, and steady high attacks. The flood attack model may be injected into the network at the entry points at which the particular flood attack is predicted to occur. The inserted attack model may contain information on various parameters such as flood load ramp time, payload size, payload encryption, source and destination of traffic flows, and the like. According to one exemplary embodiment, the flood attack model may consist of starting time, flood load, destination (unicast, multicast, or broadcast), and end time. The virtual flood attack messages propagate through the network as the actual flood would and update the logical processes with a corresponding loss of bandwidth for legitimate traffic.

In one embodiment, the flood attack model of the present invention may be simulated in a system that utilizes an Atropos architecture based upon the AVNMP or Active Virtual Network Management Prediction and which advantageously benefits from the use of Active Networking and provides the ability to use fine-grained executable models in the network to enhance communication. Atropos is comprised of driving processors, logical processors, and virtual messages. The Active Virtual Network Management Prediction and the use of Active Networks is discussed in S. F. Bush and A. B. Kulkarni, *Active Networks and ActiveNetwork Management: A Proactive Management Framework*, Kluwer Academic/Plenum Publishers, ISBN 0-306-46560-4, 2001, the contents of which are herein incorporated by reference as if set forth in their entirety. In the Atropos architecture of the invention, the logical processors and driving processors execute within an active network execution environment on each network node.

Atropos also enables the injection of an optimistic parallel and discrete simulation of a network into the Active Network. Virtual flood attack messages of the invention are provided to the network at a driving processor node and propagate through the system by traveling to other logical processor nodes of the information system.

In one exemplary embodiment, the algorithmically compressed flood attack model that is injected into the system, includes code that is injected to the network level of the information system. In this embodiment, an Active Network is utilized to inject packets carrying code from the application level to the network level at a driving process node. The injected code changes the behavior of the system as it hops from node to node at the network level, updating the network nodes with future load of the attack. In other embodiments, other injection techniques may be used.

For the simulated system architecture, the network infrastructure may be considered to consist essentially of two main components. The first is a node that is in charge of transporting and/or determining what happens to a packet during transport. Routers, hubs, gateways and firewalls all fall under this category. Active nodes and an active host node are included. The second main component consists of end points of a network which receive a packet, perform processing based upon the packet, and then return a reply to the sender.

Within this framework, the system consists of at least two useful architectural components: network infrastructure/components (designated NStack); and network services (such as DNS). Network components (NStack) handle communication from the node and act to transport the packets. The NStack network component receives and forwards packets and aggregates active packets such that the packets that carry information for a given time frame are aggregated and sent forward to the next hop. This enhances flexibility and control of the system. The NStack network component simulates the network backbone and stack and also simulates node-specific information such as memory and processing resources on target nodes, bandwidth between neighboring, non-target nodes and also limits throughput between nodes. Through NStack, it can be determined what happens to a packet as it travels through a network. Packet filters, bandwidth limiters and firewalls may also optionally be implemented within NStack.

Another key component is an exemplary simulated network service. In one embodiment, DNS (Domain Name Service) may be used as an exemplary network service. DNS is a basic network service that, upon receiving a request, determines an amount of processing time and memory usage needed, then processes the request using a certain amount of processor time, formulates a reply and then returns the packets to the source.

The attack simulation process of the present invention includes an Atropos architecture that generates predictions of future states to occur which, in turn, drive future processes and predictions. Atropos, however, operates in discrete time steps. In order for the simulation process to occur, NStacks are first injected into the system and flooded throughout the network such that one instance of NStack is running on each node participating in the simulation. A reporting metric is provided in the system to enable values to be viewed external to the simulation. In one embodiment, values are posted via SNMP (Simple Network Management Protocol) which is implemented in the underlying execution environment to allow for the simulation to record its current states. Next, an attack master is placed in the system.

The attack simulation of the present invention includes three main parts: the attack handler, the attack packet and the attack master. The attack master is a program of executable code installed on a single node, the active host, and it determines which nodes are selected to take part in the attack. All, none, or some of the nodes of the network may participate. The attack master sends an attack handler to each of the participating nodes where they will remain dormant until further notification from the attack master. The user injects a final packet (i.e., an AttackPacket) into the system which triggers the attack master to send an INITIATE_ATTACK message, or the like, to every node in the system that contains an attack handler. After the attack master sends an initiate attack message, it then terminates.

The attack handlers are programs of executable code and play the role of driving the simulation forward. When the attack handler arrives at a node, it waits for a signal from the attack master to begin its attack. Upon receipt of the message from the attack master, the attack handlers commence their attack on the system by generating and sending virtual messages to themselves and to other attack handlers on targeted nodes throughout the system. Attack handlers therefore also receive virtual messages from other attack handlers, in addition to sending out the attack packets. The attack handlers send packets to the NStack present on same node and such packets may include traffic information. The attack handler has a predefined attack metric that it uses when sending packets. This metric may be modified to accommodate the different types of attacks a user may wish to test. The virtual packet size may be varied and the information sent out in the attack packets may be tailored to adjust time between virtual attacks to produce a bursty attack or a streaming attack. Following the initiation of the attack handlers, packets are sent to local host node with the incoming packets being picked up by the NStack. At this point, NStack stores values contained within all of the incoming attack packets that fall within a certain timeframe. When the LVT (Local Virtual Time) of an incoming packet exceeds the predefined window of the NStack, NStack aggregates all packets, forms a new packet and then sends the aggregated packet to the next hop. The attack handlers continue to send packets and NStacks continue to aggregate and forward packets through the network to propagate the simulated attack through the system, and eventually an upper bandwidth is reached.

The attack packet plays an important role in the simulation. The attack packets represent data transferred from machine to machine, or node to node (i.e. static data). The underlying network infrastructure is not impacted because the attack packets carry a virtual set of packets (that would otherwise be transported through the system had an actual attack occurred). The attack packet also contains instructions on how to pass information to the node once the packet arrives. In addition to starting all the attack handlers, the attack master is in control of the time it takes a single packet to touch or flood every node in the simulation.

In one embodiment, the attack handlers insert the flood attack model by injecting a description from a java properties file into the system. In other embodiments, other insertion methods may be used. According to the java properties embodiment, a java properties file is provided and stores a description of the flood attack. Java programming language is well known in the art and java properties files are simple text files also known in the art. Information from the java properties file describing the attack is used to generate virtual messages describing the attack. A virtual message is a packet, either active or passive, that carries state information anticipated to exist in the future. In one embodiment, the virtual message carries executable code. In another embodiment, the virtual message does not carry executable code but carries an active packet facilitating prediction by carrying code that affects a node's notion of time. Such a virtual message may be referred to as a streptichron. Fine-grain executable models carried by streptichrons are introduced as active packets that are expected to exist in the future and which carry executable code necessary to represent future behavior. The executable code used to represent future behavior is designed in a more compact form than transmitting equivalent (static, non-executable data in a piecemeal fashion) as the algorithmic nature of the streptichron allows for high compression.

In addition to simulating the attack, in one embodiment the attack projection system of the present invention may additionally simulate normal system operation during the attack by projecting the normal system operation forward in time using virtual messages, while actual system operation is taking place uninterrupted. At the same time that the attack handlers are sending out attack packets, the simulated packets describing normal system operation also travel throughout the system Packets carrying code describing virtual component models of components of the information system, are injected into the system. The system component models are projected forward in time along with the attack model. The system components may be chosen to be components that are most susceptible to attack. The virtual messages of the attack model are processed by those injected component models to analyze the impact of the flood attack upon the system. The injection of the system component models allows the attack model and normal system operation to be simulated at the same time in the future to analyze the impact of the virtual time-projected attack model upon the virtual time-projected model of normal system operation. Because the virtual component models, like the flood attack model, are virtual messages projected forward in time, the simulated flood attack can be run on an operating system without affecting the operation of the real system.

FIGS. 1-9 provide a schematic of an exemplary communication network and illustrate the commencement of a flood attack upon the system represented by the communication network. FIG. 1 shows network 2 including active host node 4 and active nodes 6. Active nodes 6 are also designated AN-1, AN-2, AN-3, and AN-4. Links 8 connect the nodes. The system component hereinafter designated NStack, has been injected into network 2 on active host node 4. Network 2 may represent various communication and information systems.

Figure 2:
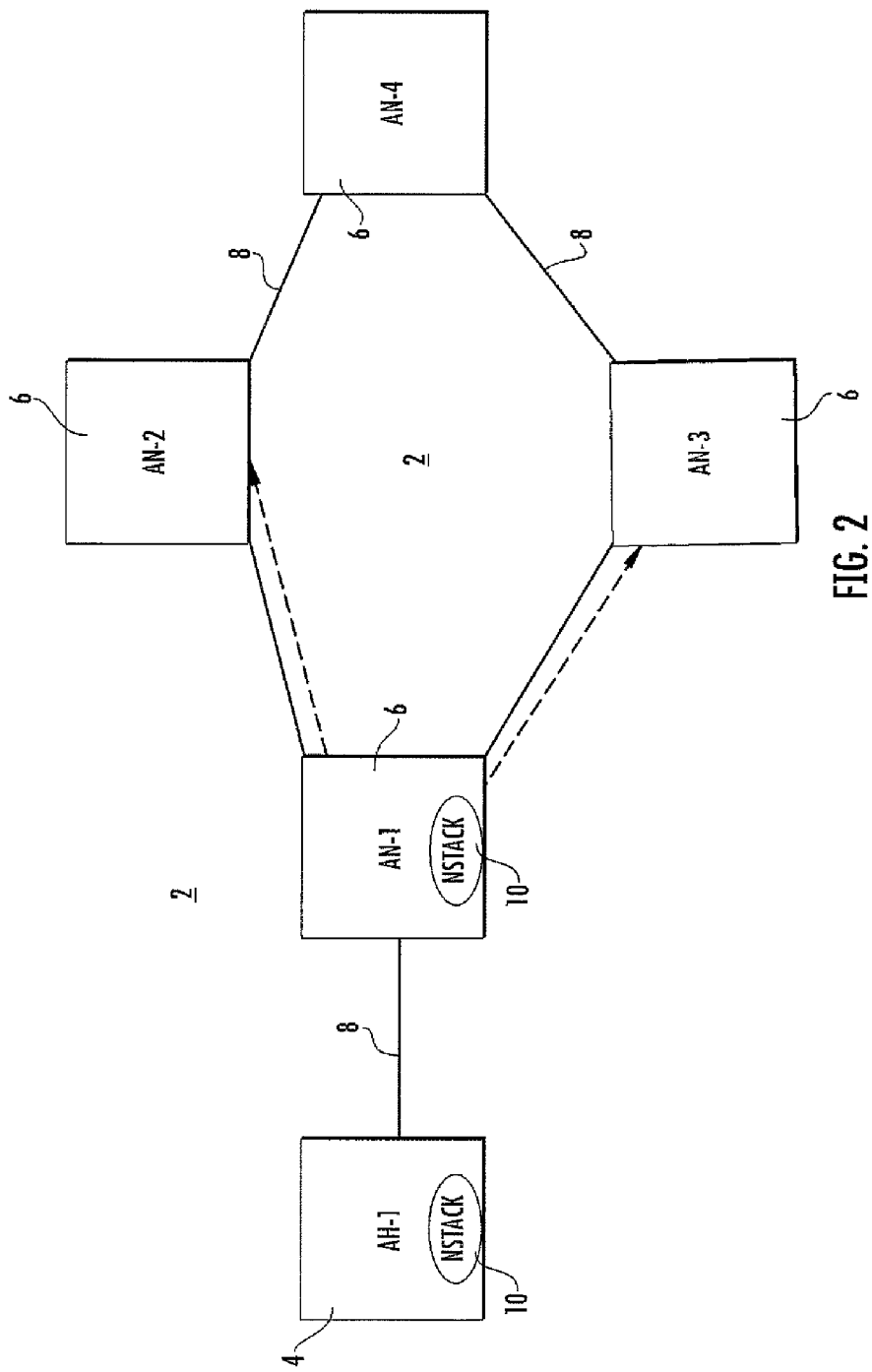
Figure 3:
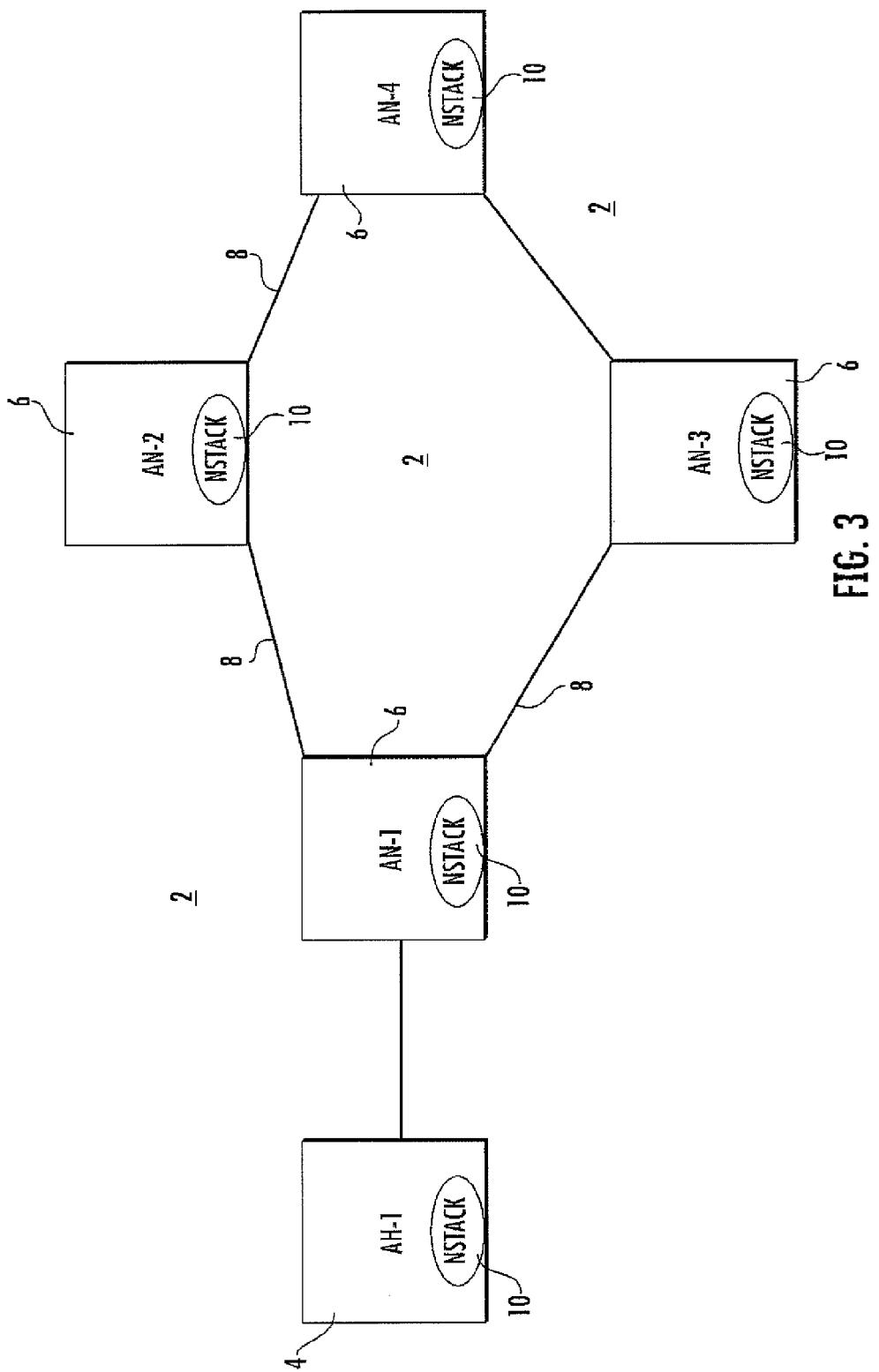
Figure 4:
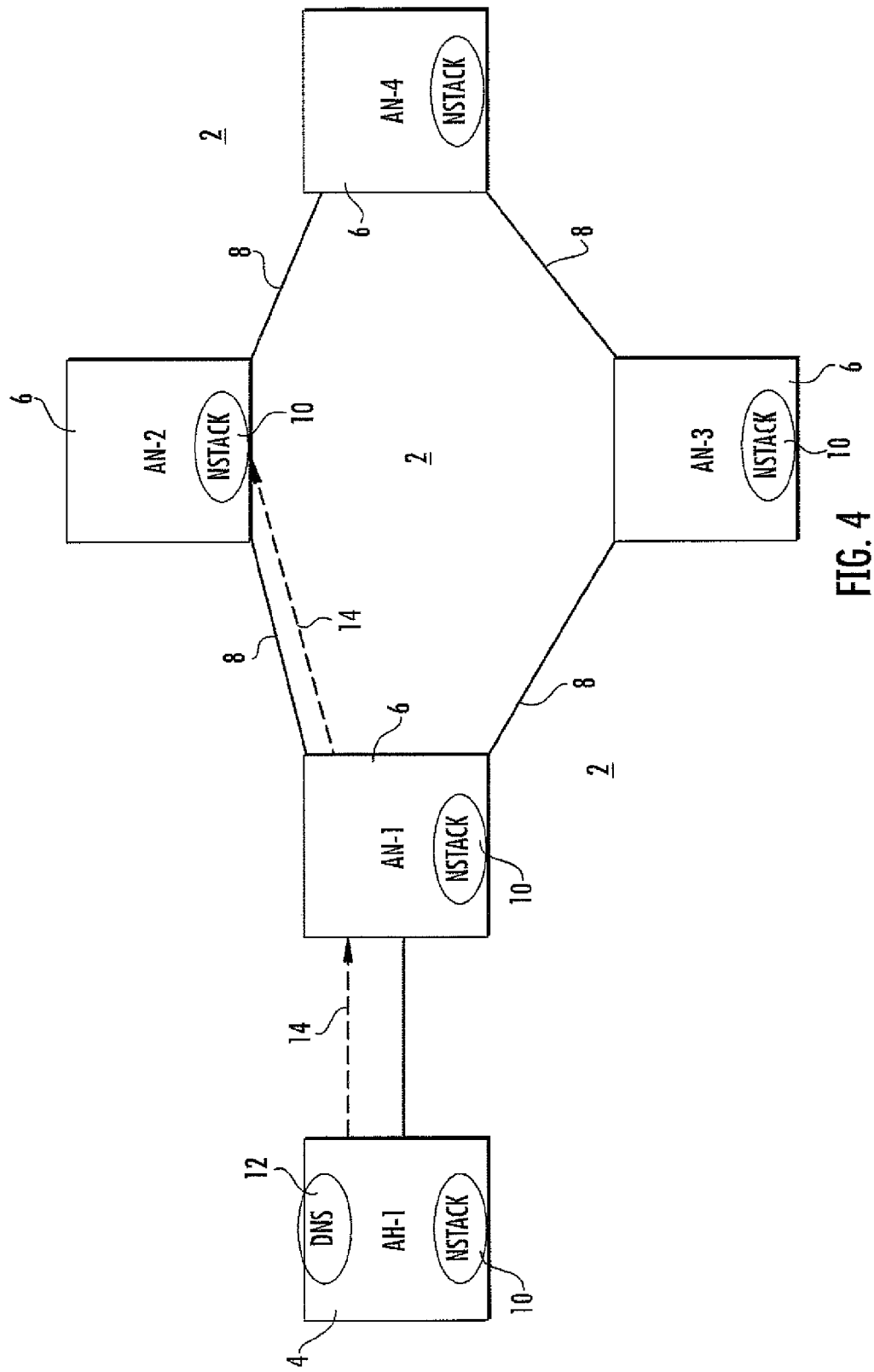

FIG. 2 shows network 2 during a time in which the NStacks 10 are being flooded throughout the network. NStack 10 also resides on AN-1 of the active nodes 6 in FIG. 2. FIG. 3 shows the network after an NStack has been injected onto each of the nodes of the system that will be participating in the flood model simulation, i.e., NStack 10 is running on active host node 4 and active nodes 6 in the illustrated embodiment of FIG. 3. FIG. 4 shows DNS 12 injected into the system at active host node 4. DNS 12 represents the simulated network service that will be the target of the attack and, as indicated by arrows 14, DNS 12 will be injected to the active node 6 designated AN-2 where it resides during the attack.

Figure 5:
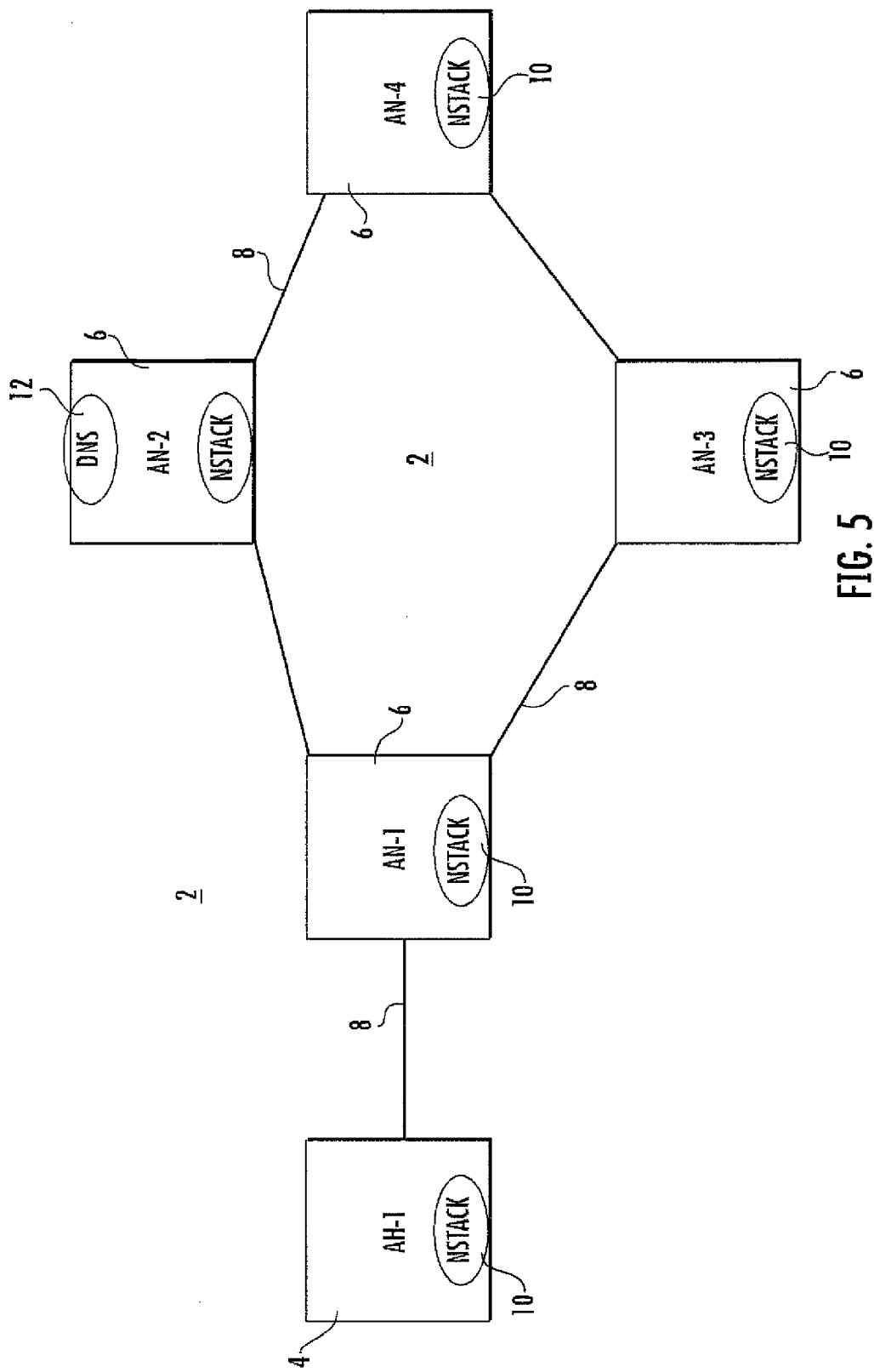

FIG. 5 shows network 2 with NStacks 10 running on active host node 4 and each of the active nodes 6. FIG. 5 also shows DNS 12 residing on the targeted active node 6 designated AN-2.

Figure 6:
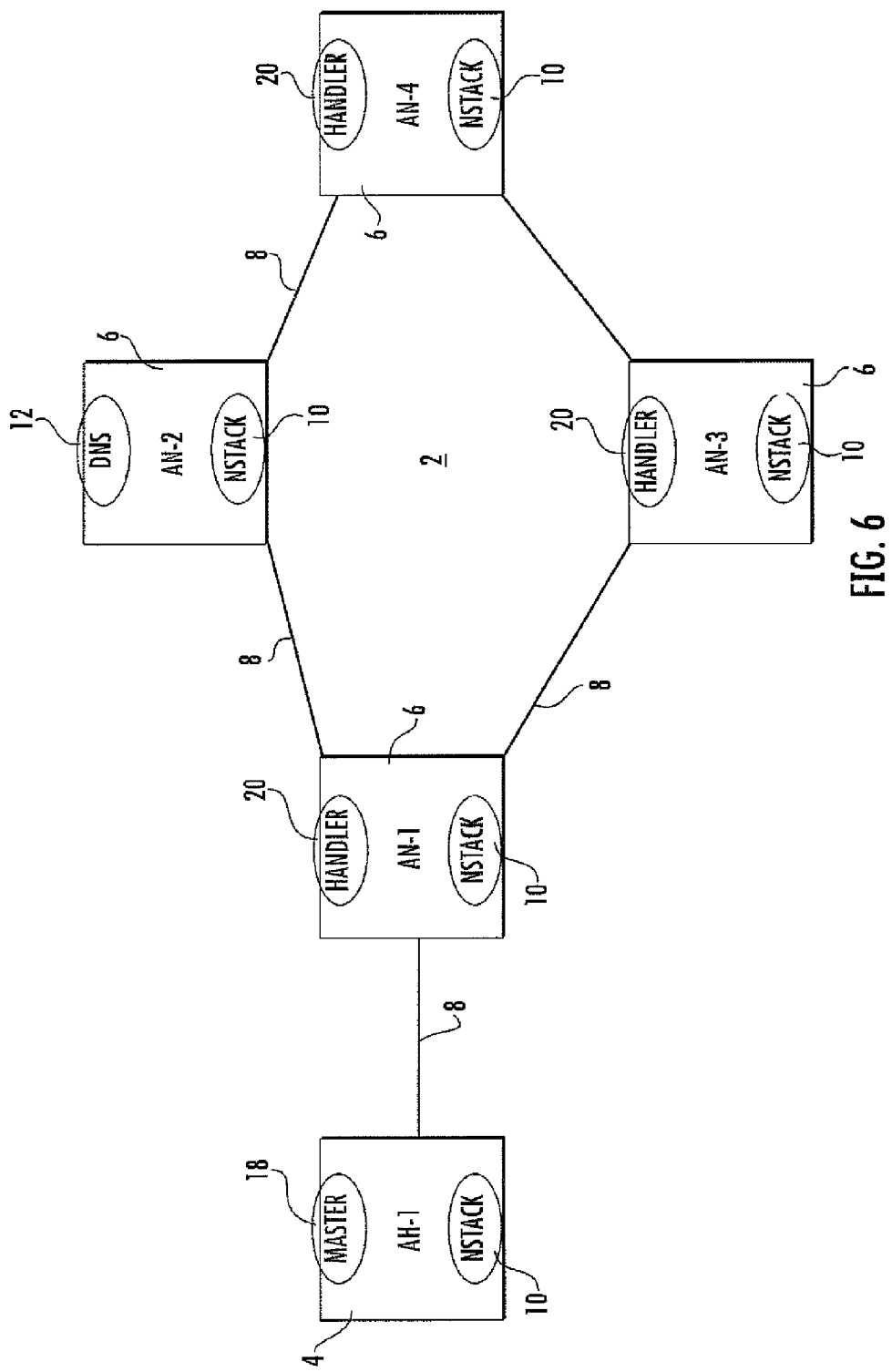
Figure 7:
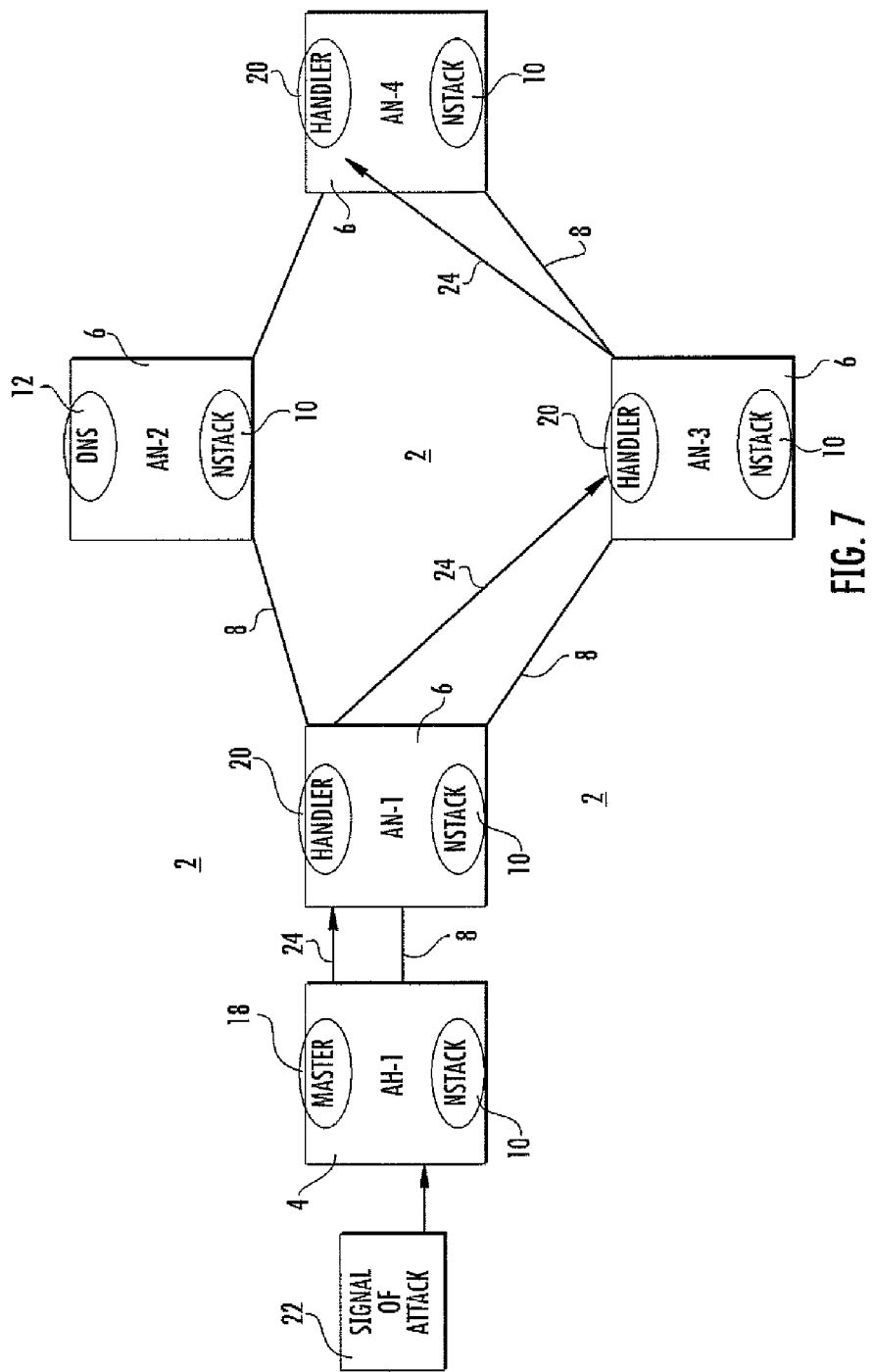

FIG. 6 shows network 2 after attack handlers 20 and attack master 18 have been installed as illustrated. Attack handlers 20 are installed on each of the active nodes 6, other than the active node 6 that includes DNS 12 (i.e., active node 6 labeled AN-2), that will participate in the attack simulation. In other exemplary embodiments, network 2 may include additional active nodes 6 that do not participate in the attack simulation and therefore do not include an attack handler 20. Attack master 18 determines which of the nodes participate in the attack and sends active handlers 20 to each of the participating nodes where they remain dormant until further notification from attack master 18. FIG. 7 shows attack initiation. Signal of attack 22 is injected by a user into active host node 4 which includes attack master 18. This triggers attack master 18 to send an initiate attack message 24 to each of the participating attack handlers 20.

Figure 8:
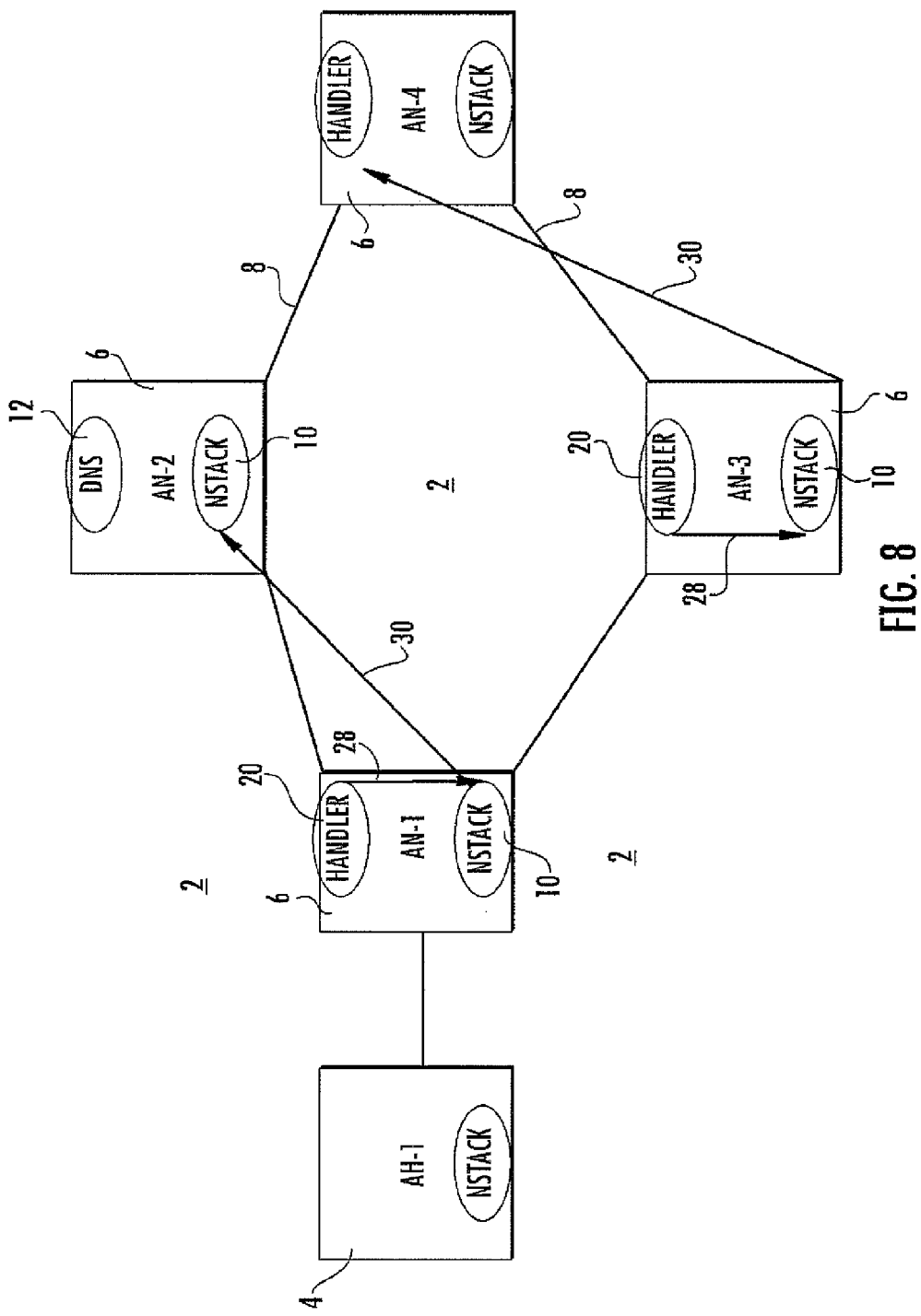
Figure 9:
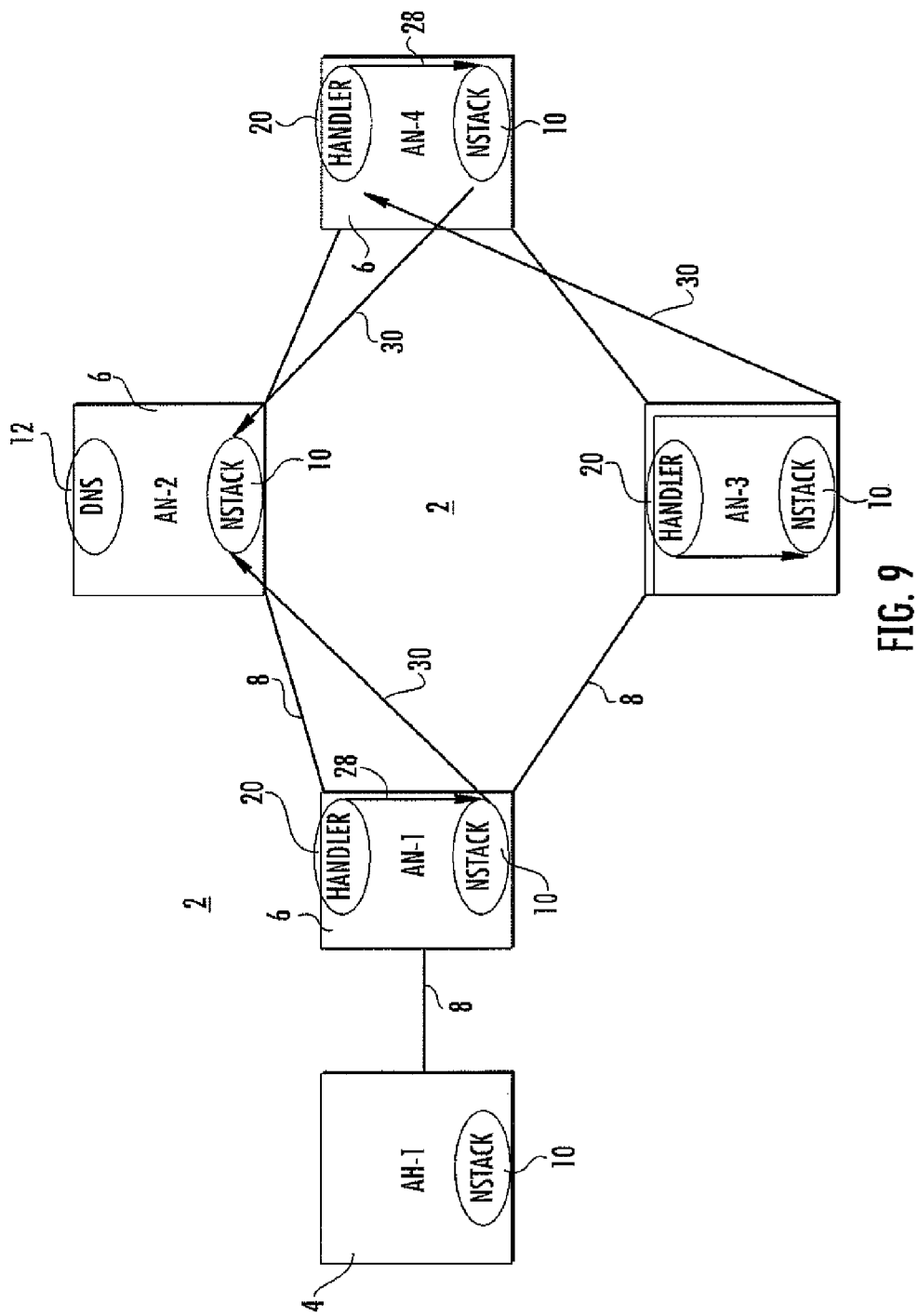

Attack handlers 20 then commence their attack on the system as shown in FIG. 8. FIG. 8 shows attack handlers 20 sending virtual messages throughout network 2. Included among the virtual messages are virtual messages 28 that are packets sent by attack handler 20 to the NStack 10 resident upon the same node as the sender attack handler 20. Traffic information may be included in messages 28. Virtual messages 30 of the flood attack model travel between nodes. Virtual messages 30 are sent and received by attack handlers 20 using the corresponding NStack 10. FIG. 8 shows one of the attack messages 30 arriving at the target site, i.e., the active node 6 designated AN-2 and which includes attack target DNS 12. FIG. 9 shows a further progression of the flood attack model propagating through network 2. Virtual messages 30 are shown propagating through the system, i.e., traveling between the nodes that are participating in the attack, i.e., active nodes 6 including the attack target node designated AN-2. At that same time, virtual simulated normal system operation messages may also be traveling through the system along the same paths.

Because virtual messages 30 and optional virtual simulated normal system operation messages are time-projected virtual messages, they do not impact network 2 which may be concurrently operating. Operations that may be executed by and at the nodes (active host node 4 and active node 6) participating in the flood attack simulation, are not impacted by the propagation of the virtual attack model throughout the system, i.e., the system is not disrupted.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of simulating a flood attack in a communication network comprising:
    providing a communication network comprising:
        a plurality of nodes including an active host node and a plurality of further active nodes, said plurality of further active nodes including a target node and a plurality of participating nodes that participate in the flood attack simulation;
        a network component that transports packets, installed on each of said plurality of further active nodes;
        an attack handler on each of the participating nodes of said plurality of further active nodes; and
        an attack master program;
    each of said attack handlers generating virtual messages of an attack model projected forward in time, wherein said virtual messages include normal system component models also projected forward in time;
    sending said virtual messages to said target node and others of said attack handlers, said participating nodes not including said target node;
    injecting said attack handlers onto said participating nodes and sending an initiate simulated attack message to said attack handlers disposed on said active host node;
    causing said virtual messages of an attack model to propagate through said communication network, whereby the communication network's operation is not disrupted because the virtual messages of an attack model are projected forward in time.

2. The method as in claim 1, wherein sending said virtual messages to said target node and others of said attack handlers includes sending a packet to a driving process node of said communication network.

3. The method as in claim 1, further comprising providing a java properties file that stores said attack model and wherein generating said virtual messages of an attack model comprises inserting a description of said flood attack from said java properties file.

4. The method as in claim 1, further comprising injecting virtual component models of normal operation of said communication network.

5. The method as in claim 1, further comprising providing a simulated network service as an attack target, on a target node of said communication network.

6. The method as in claim 1, wherein said injecting and said causing steps comprise an attack master program injecting an attack handler program on a plurality of nodes of said communication network, each attack handler program receiving instructions from said attack master program and generating virtual messages describing said flood attack.

7. The method as in claim 1, wherein generating said virtual messages of an attack model projected forward in time includes algorithmically compressing a description of said flood attack by representing information about said flood attack in the form of executable code.

8. The method as in claim 7, wherein said virtual messages of an attack model are active packets carrying executable code.

* * * * *

UNITED STATES PATENT AND TRADEMARK OFFICE
CERTIFICATE OF CORRECTION

PATENT NO.        : 8,122,504 B1
APPLICATION NO.   : 12/579456
DATED             : February 21, 2012
INVENTOR(S)       : Stephen Francis Bush et al.

It is certified that error appears in the above-identified patent and that said Letters Patent is hereby corrected as shown below:

Title Page
In the Inventor's Section (75), the last name of the second listed inventor should be spelled
--Kulkarni--.

Signed and Sealed this
Third Day of April, 2012

David J. Kappos
*Director of the United States Patent and Trademark Office*